Aug. 17, 1948.  H. C. HAYES  2,447,333
ULTRA-AUDIBLE SOUND RECEPTION
Filed Dec. 30, 1931  3 Sheets-Sheet 1
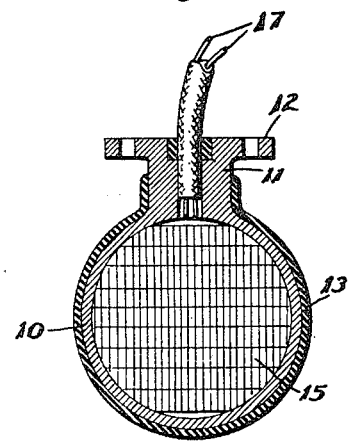
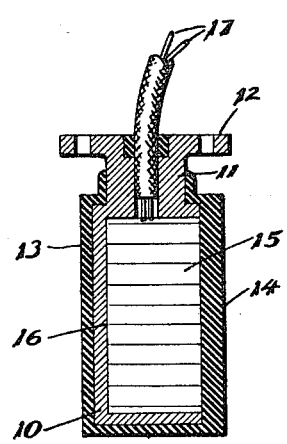
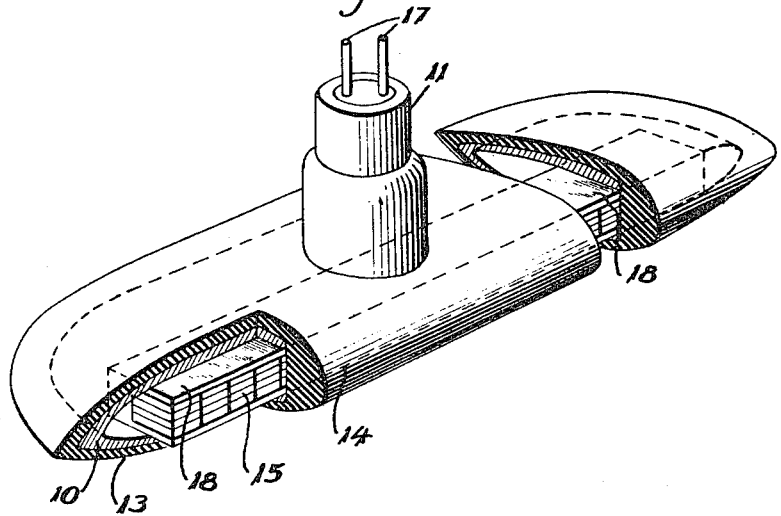
INVENTOR
*Harvey C. Hayes*
BY
ATTORNEY

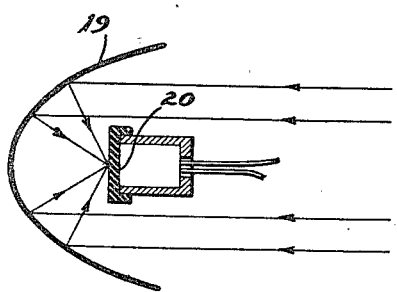
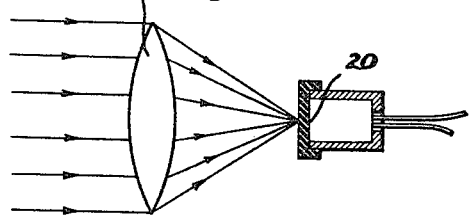
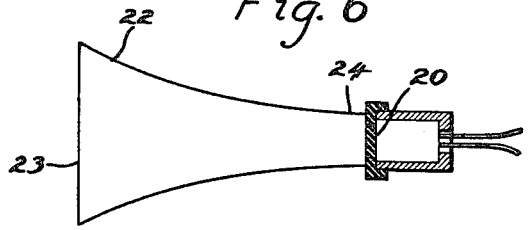

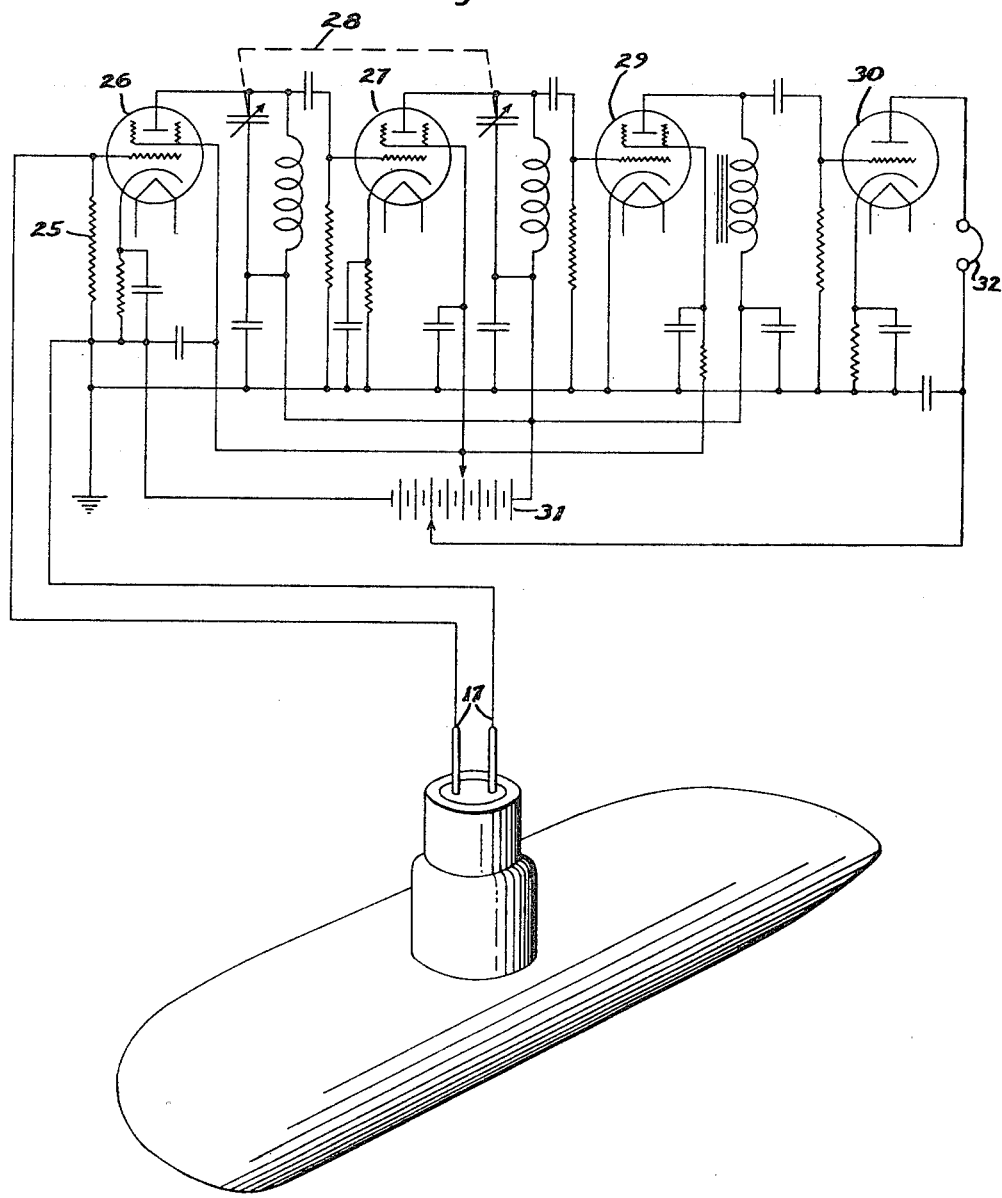

Patented Aug. 17, 1948

2,447,333

UNITED STATES PATENT OFFICE 2,447,333

ULTRA-AUDIBLE SOUND RECEPTION

Harvey C. Hayes, Washington, D. C., assignor to United States of America as represented by the Secretary of the Navy Application December 30, 1931, Serial No. 583,993

18 Claims. (Cl. 177—386)

This invention relates to the reception of ultra-audible sound energy and more particularly to the detection of the presence and determination of the direction of sound sources by means of the ultra-audible components of the emitted sound.

This invention has for its objects, first, the furnishing of a method for detection of the presence and determination of the direction of sound sources by means of the ultra-audible components of the emitted sound;

Second, the supplying of apparatus for practicing the above method;

Third, the simplification and decrease in cost of ultra-audible sound receivers;

Fourth, the increasing of the effectiveness of directive sound reception both as regards apparatus and methods of procedure;

Fifth, the providing of sound detecting methods and apparatus that are free from the numerous weaknesses inherent in types which operate on audible frequencies which may be summarized as follows: Excessive weight, bulk and cost; slowness and difficulties attending operation; limitations in operation such as interferences from local noise which requires the listening ship to lie to or proceed under very low power; and limitation in operating area which requires that the depth must be not greater than 500 fathoms.

With the above and other objects in view, this invention consists in the construction, combination and arrangement of parts as will be described more fully hereinafter.

Within the art of generating and receiving wave energy it is recognized that the energy emitted by a generator is non-directional, that is, it is radiated about equally in all directions, when the dimensions of the radiating area are small with respect to the wave length of the radiated energy and that, conversely, the radiated energy becomes highly directive when the dimensions of the radiating area are large with respect to the wave-length of the radiated energy, the degree of directivity depending upon and being somewhat proportional to the ratio of the dimensions of the radiating area to the radiated wavelength. In making this statement it is assumed that all parts of the radiator are oscillating in phase. Likewise, it is recognized that a receiver of wave energy shows no distinct maximum effect when it is rotated with respect to the direction of the energy flow if its dimensions are small with respect to the received wave-length but that it does show such maximum effects if its dimensions are large with respect to the received wave-lengths.

My invention results from a recognition of these broad principles as applied to sound waves in general and to submarine sounds in particular and finds its useful application in the location of power-driven ships by determining the direction of the sound generated by their propellers or auxiliary machinery, though it may be applied equally well for other purposes. Heretofore it has been customary to determine the direction of such sounds by means of sound receivers responsive to the audible components of the sound. Such receivers are naturally made responsive to the range of pitch covering from about 400 cycles to 1200 cycles which averages about 800 cycles, the pitch to which the average ear is most sensitive. Because of the high velocity of sound in sea water, about 4800 feet per second, the average wave-length within this range of pitch proves to be about 6 feet. For a receiver of such wave-lengths to be directive, i. e. to show a sharp maximum of intensity as it is rotated, its dimensions must be made large with respect to the wave-length and this would require that the receiving area should be equivalent to a circle of at least 30 feet in diameter. Such areas are impractical, to say the least, and may well be regarded as impossible to use on shipboard.

Because of these facts it has been found necessary to determine the direction through use of the binaural sense. As is well known in the art, the binaural sense operates to enable a listener to judge the direction of a sound through the time difference in arrival of like components of the sound at the two ears. Sound receivers that operate on the binaural principle must, therefore, have at least two receivers or groups of receivers, one for each ear, and for installations where the two receivers cannot be rotated there must be at least one other receiver or group mounted out of line with the first pair so that the ambiguity of direction which is inherent in binaural devices can be removed by use of a second pair of receivers having its line of centers, "binaural base-line," oriented differently than for the first pair. Such a sound detecting installation is clumsy, heavy, expensive and slow and difficult to operate at best. It also has two outstanding weaknesses, namely, since the receiving units are non-directive (their dimensions are small compared with the received wave-lengths) they are sensitive to all local sounds generated on the listening ship, the intensity of which is sufficient to partially and at times wholly mask the weaker sounds received from a distant ship. Thus the effective range of the device is cut down due to the amount of local noise generated on the listening ship because the receivers are responsive to these noises and cannot be effectively shielded from them. The second weakness arises from the fact that the long wave-length audible sounds that are heard from a distant ship on a local receiver have reached the receiver through reflection from the sea bottom. This condition results from destructive interference between the direct and surface reflected portions of the sound reaching the receiver. The length of these two sound paths usually differs by less than a quarter of the wavelength and, since the surface reflected ray suffers a 180 degree change of phase upon reflection, these two components reach the receivers in condition to interfere almost perfectly. As a result the apparatus fails to work in water where the depth is so great that the bottom reflected components of the sound are too weak to be heard. In practice it has been found that this condition holds for depths much beyond 500 fathoms. Thus we see that this type of sound detector becomes inoperative over all the ocean areas except for comparatively narrow strips along the shore lines.

Research has shown that sounds in general and propeller sounds in particular have ultra-audible components of sufficient intensity to be heard at ranges comparable with those at which receivers of the audible components operate. The sounds generated by hammer blows, tearing of paper, rattling of sheets of metal, sirens, air jets, etc., all have such high pitched components. In propeller sounds the emitted spectrum appears to be almost continuous from 20 to 60 kilocycles. This spectrum has high and low intensity regions at various frequencies depending upon the type and speed of the propellers but the average intensity is surprisingly high. There is no reason for doubting that the propeller sound spectrum extends far above 60 kilocycles, but the absorption coefficient of water for the higher frequencies becomes too great to permit the sound to travel to great ranges. For this reason it is impractical to work with frequencies much beyond 50 kilocycles, but for the purposes at hand there is no need of going to higher frequencies. The wave length of a 40 kilocycle sound wave in water, having a velocity of 4800 feet per second, is less than 1.5 inches and as a result a circular area one foot in diameter would have good directivity and such dimensions are practical from an operating standpoint.

Having proved that sound sources in general and that revolving propellers in particular generate the high pitched components with sufficient intensity for reception at a distance and that, therefore, the direction of the sound could be determined by a rotatable directive type of receiver of practical weight and dimensions, it only remained to develop the receiving apparatus. My researches in connection with this development have shown that it is impractical, if not impossible, to use diaphragms for either receiving or generating super-audible sounds for the reason that the required thickness of the diaphragm becomes of the order of the wave-length of the sound so that instead of oscillating as a whole to generate sound waves in the surrounding medium, the diaphragm itself becomes a medium for conducting the sound waves. Under these conditions the particles of the diaphragm along the direction of its thickness do not move back and forth in phase but at any instant have a phase distribution in accordance with the sound waves passing through. If the thickness is as great as a half wave-length there will be, at any instant, some one or more planes within the material and parallel with the face where the particles are moving in direct opposition to those in the plane of the inner driven face and under such conditions the plate does not act as a diaphragm. However, if the thickness of the plate is made equal to an integral number of half wave lengths of the pitch to be generated, a standing wave system will be set up in the plate, and the outer surface, being a loop, will generate sound in the adjacent medium. The converse of this holds true. For reception, the high frequency waves cannot readily be made to oscillate a diaphragm tuned to their frequency because the required thickness of the diaphragm will be so great that it will serve as a medium for conducting the waves through to the inner face and will not move out and in as a whole as is required for diaphragm action. Therefore, in receiving these high pitched sounds, the best we can expect from their action on a receiving element is to change the pressure distributions therein as the impinging waves penetrate the material of this element. It therefore becomes necessary to choose for the receiving element some material wherein these passing or varying pressure gradients will produce electrical or magnetic effects that can be utilized. Such materials are found in crystals having piezo-electrical properties or in metals having magneto-strictive properties, as has been shown by Chalowsky and Langevin 1,471,547 and Nicholson 1,495,429. The use of such materials for generating and receiving signals of a definite tuned pitch is comparatively old in the art of acoustics. But the use of such materials for a directive sound receiver untuned so as to receive equally well over a broad band of frequency or so broadly tuned as to cover such a frequency band is, so far as I know, new in the art. My invention embodies such sound receivers.

My researches have shown that a thoroughly untuned receiver employing the principal outlined can be had if the dimension of the receiving element along its directive axis, that is, along the direction of the received sound when the receiver is oriented to the position of maximum intensity, is less than a half wave-length in the material of the element of the highest pitch to be received. Under such conditions the receiver will be untuned for all frequencies below this value and will be about equally sensitive for a wide band of frequencies adjacent the upper limit but becomes insensitive to the very low frequencies where the wave-lengths become so long that the element is moved bodily like a diaphragm. In the case of Rochelle salt crystals, which have proved to serve excellently for my purpose, the velocity of sound in such crystals is $4.15 \times 10^5$ centimeters per second. The wave-length for a frequency of 50 kilocycles is 8.3 centimeters and the half wave-length is 4.15 centimeters. If such crystals are used as the active receiving element and their length in the direction of sound approach is less than 4.15 cm. there will result an untuned receiver for frequencies below 50 kilocycles. Under this condition the cut crystal may be termed a vibratory crystal in the sense that certain portions will move in relation to other portions to effect alternate contraction and elongation or variations in compression. Both quartz and magneto-strictive materials can be used for the receiving elements and their dimensions determined in the same way. Good reception has been obtained on receivers employing these materials, but in its preferred form the Rochelle salt crystals are employed.

As already stated, a receiver becomes directive in proportion as its dimensions—the dimensions of its receiving elements—become large in proportion to the wave-length. This statement refers to the dimensions of the area of the receiving element or elements exposed to the action of the sound waves and may be the end area of one large receiving element or of several elements mounted side by side so as to expose a mosaic-like area to the sound. Such a receiver derives its directivity through the well-known laws of wave interference. For a circular area it can be shown that the angle ($\theta$) through which the receiver needs to be turned from a direction face on toward the sound where maximum intensity is had to a position where the intensity falls off to some specified percent of this value is given by the relation: (1) $\lambda/d = k$ sine $\theta$ where ($\lambda$) equals the wave-length of the received sound in the medium, ($d$) is the diameter of the circular receiving area and ($k$) is a constant. The value of ($k$) becomes about (0.6) when the beam width is carried out to an intensity 10% of the maximum at its center. Numerous tests have shown that the sharpness of the maximum—in other words the directivity—of such a receiver will permit of determining the direction to within about three degrees when the ratio of ($\lambda$) to ($d$) is made to be about $1/7$, that is to say, when the diameter of the receiving area is about seven times the received wave-length. If this ratio is increased, the directivity will be sharpened in accordance with the relation given in equation (1). From the symmetry of the circular receiver face it is obvious that the directivity is of the nature of a cone-shaped beam ($\theta$) representing the angle of the cone. Receivers may be made with rectangular shaped faces and in that case the directivity takes a pyramidal form, the angle subtended by opposite sides being determined by the ratio of ($\lambda$) to ($d$) where ($d$) is the distance across the receiver face between the edges subtending the two opposite sides in question. It will, therefore, be seen that the directivity with respect to the long dimension of the rectangular face of the receiver will be sharper than it will be with respect to the shorter dimension for the reason that the ratio ($\lambda$) to ($d$) will be less for the longer dimension.

The above reasoning leads to a conception of my most useful form of receiver so far as the detection of propeller sounds is concerned. Our main interest in the direction of such sounds has to do with their bearing in azimuth. This will be given by a narrow line of receivers extending in a horizontal plane and mounted for rotation about a vertical axis. Such a line of receivers can be readily housed in a streamlined form that will not offer much resistance against the motion of the ship and that will not generate sufficient turbulence and eddies to interfere with its efficient operation even while the ship proceeds at speeds up to about 15 knots as shown by numerous tests.

As anticipated, tests have proven that both circular and rectangular forms of directive receivers, when mounted on a vertical shaft extending through a ship's hull so that the receiving surface faces in a horizontal direction as required for picking up the sounds from a distant ship, are very insensitive to the local sounds that prove to be so troublesome in case of the binaural types. The reason is obvious and is due to the fact that the local noises are generated above the plane of the receiver and as a result do not meet its face perpendicularly as is required for sensitive reception. And these receivers are not much troubled with the sounds made by slapping of waves against the ship or the breaking of surface waves outward along the line of directivity of the receiver for the reason that the inertias and associated restoring forces brought into play by these surface disturbances are not such as to generate the high pitched sounds, though they do generate fairly intense audible sounds.

It is obvious that the reception of the super-audible components of propeller and other sounds must include some means for making them audible. This can be accomplished by beating the received frequencies against a standard frequency in accordance with either the heterodyne or autodyne principle, but in the case of the high frequency components of ordinary sounds or noises these high frequencies are not steady in either pitch or amplitude but are constantly modulated in accordance with the characteristics of the lower pitched components of the sound, and as a result those modulations that are within the audible range can be heard, after being suitably detected, without the use of beat frequency reception. The sensitivity of the reception is somewhat increased by heterodyning or autodyning the received high pitched sounds but the quality of the sound heard is better without the superposition of a beat frequency. And in cases where the modulation is strong the simple detector tube gives about as good sensitivity as the autodyne or heterodyne.

My receiver is so designed that, upon proper orientation with respect to the direction of the sound, the wave energy from an area of the wave front having dimensions large with respect to the wave-length can be made to react in phase on the exposed surface of the active material together with a properly designed amplifier for magnifying the comparatively weak electrical response of the receiver. Such a receiver can be realized in two distinctly different ways: One by making the exposed area of the active material equal to the area of the wave front to be received and the other by collecting the energy from this area to a much smaller cross-section by changing the direction of the rays through reflection or refraction, that is, through the use of reflectors or lenses. The second method requires much less active material but it presents structural difficulties which tend to offset this advantage.

My invention can best be understood by reference to the accompanying drawings forming a part of this specification, in which like reference characters indicate corresponding parts throughout the several views, and in which:

Fig. 1 is a section through the vertical axis of a receiver of the first type parallel to the receiving surface;

Fig. 2 is a section through the receiver of Fig. 1 perpendicular to the receiving surface;

Fig. 3 shows in perspective a receiver with rectangular receiving surface and streamline housing;

Fig. 4 illustrates a receiver with a parabolic reflector for concentrating energy from a comparatively large area to a much smaller area;

Fig. 5 shows a receiver with a condensing lens for making a similar concentration;

Fig. 6 shows a properly designed horn by which the concentration is made;

Fig. 7 shows a typical amplifier connected to the receiver.

In Fig. 1 reference number 10 indicates a cylindrical casing open at one end and closed at the other and carrying on the outside a neck 11 and flange 12 by which it can be bolted to a rotatable support not shown. The whole casing is covered with rubber 13 to give water-tight integrity. The rubber face 14 closes the open end of the casing 10 to form a sound window through which the sound waves penetrate to the active elements 15. These active elements preferably Rochelle salt crystals, are piled in parallel arrangement so that they substantially fill the casing, the inside of which is coated with an insulator to avoid the possibility of grounding the crystal electrodes. The crystals 15 of similar shape and size are cut in the form of elongated rectangular parallelepipeds and to such a length that they fit snugly between the inside of the rubber face 14 and the solid rigid back plate 16 as shown, for example, in Figs. 1 and 2. Thus the insulating coating backed by the walls of the casing provides within the casing a substantially rigid cup-shaped member mounting the crystals within itself with their longitudinal axes all normal to the front plane of the assemblage as shown in Figs. 1 and 2. It is to be noted that the integrality of the back plate with the casing, constitutes means for mounting the plate within the casing and that its equivalent in the form of a separate plate member secured to the back of the casing may be used. It will further be noted that this fitting of the crystals within the casing between the back plate and the sound window 14, effectively provides a mounting of the crystals on the plate with the ends flush with the plate, and effectively supports the crystals at those surfaces which are parallel to the "b" and "c" axes allowing the crystals freedom of longitudinal elongation and contraction as permitted by the rubber cover 14. Sound waves penetrating 14 react on the crystals to generate electrical charges on their electrodes, as already described, and if the wave front is substantially plane, as they will be at a considerable distance from the source, then when face 14 is oriented perpendicularly across the direction of sound flow, all the area of the wave front intercepted by the exposed surface of the crystals will react on the ends of the crystals in phase to give a maximum electrical response, while for any other adjustment the phase relations at the active surface will vary from point to point and the total effect will integrate to some value less than this maximum as heretofore explained. Conductors 17 carry the electrical energy to an amplifier, not shown. Also, the electrical connections between conductors 17 and the crystals are not shown, but will be described later.

Fig. 3 shows a design that serves particularly well as a submarine sound receiver for ships because it lends itself to a streamline housing. Again, there is a cast casing 10, covered with rubber 13, and carrying a neck 11 for attachment to a rotatable support not shown. Inside the casing is an insulated box 18 for holding the crystals, the open side of the casing and insulated box being covered by rubber 14 forming a sound window through which the sound waves can penetrate to the crystals which are so designed that the inner ends are supported against the inert box and the outer ends against the rubber window 14 which is streamlined. It will be seen that the mosaic of sensitive elements presents to the sound a rectangular face having the horizontal dimension large with respect to the vertical one and that, as explained, its directivity will be high as regards azimuth but low as regards vertical directions. However, as far as ship propeller sounds are concerned we are only interested in the compass direction or azimuth and the accuracy would not be much affected by increasing the vertical dimension while the streamlining would become less effective. Again, conductors 17 carry the electrical energy to a suitable amplifier; the electrical connections to the crystals will be explained later.

In Fig. 4 a parabolic reflector 19 collects energy from a comparatively large area on the wave front and converges it on a much smaller area on the face 20 of the receiver.

In Fig. 5 the same is accomplished by condensing lens 21. In each case the active crystal area 20 is dimensioned to a comparatively small value with respect to the received wave-length. However, the directivity for the combination of small receiver and mirror or lens, as the case may be, is high because the phase relations at the active surface is a function of the dimensions of the collector (mirror or lens) and not the crystal face area 20. The crystal combination with mirror or lens is rigidly linked together so that area 20 stays at the focal point, though such linkage is not shown in the figures.

Fig. 6 shows another design that is effective wherein the wave energy of a large area of the wave front is condensed to a small area with sufficiently proper phase relations to show high directivity. It consists of a properly designed horn 22 with a large opening 23 for collecting and concentrating the sound energy on the active surface 20 mounted at the small end of the horn 24. Here the phase relation at the active surface is largely a function of the dimensions of the mouth of the horn and its orientation with respect to the direction of the sound. This receiver is not as highly directive as the other types but this weakness is for certain purposes compensated for by its greater simplicity.

In all cases it is advantageous to surround the crystals by an oil, preferably castor oil, for purposes of insulation, damping, and preserving the crystals. The rubber sound window and the oil between the window and the crystals provide an accoustical coupling between the crystals and an external propagating medium. In the figures shown the crystals are close piled to present a continuous surface to the sound waves but this is not entirely necessary. If, say, every other crystal were removed and the spaces filled in with blanks, to constitute spacing means between crystals or rows of crystals, the receiver would still work well. In fact it will give good sensitivity and directivity so long as the crystals are uniformly spaced over the receiving surface and the separation between adjacent crystals (the spacings) are not greater than a quarter wave-length of the sound. In the interests of economy such arrangement of crystals is sometimes advantageous, particularly in cases where the sound energy is not concentrated by mirrors or otherwise and a large section of the wave front is to be intercepted to assure high directivity.

Since each crystal of the multiplicity employed in the receiver carries two electrodes upon which the excited charges collect, they each partake of the nature of a condenser and can be connected in series or parallel or in series parallel as desired. In practice they are so connected as to make the impedance of the receiver match the input impedance to the amplifier.

Preferably, the crystals are made by cutting a slice normal to the "a" axis and having edges making angles of forty-five degrees with the "b" and "c" axes, thus forming the rectangular flat blocks 15 each with its opposite large surfaces parallel to the "b" and "c" axes, and its end edges or surfaces perpendicular to its longitudinal axis, or axis of elongation, which may be termed a compressional axis. The compressional axis of the crystal is the axis in which the greatest elongation and compression take place. This manner of cutting the crystal is well known in the art and is exemplified in the patent to Sawyer No. 1,803,274 issued April 28, 1931, and an article by Sawyer entitled "The use of Rochelle salt crystals for electrical reproducers and microphones" Proceedings of The Institute of Radio Engineers, November 1931, pages 2020 to 2029. The "a" axis is the shortest distance through the crystal slice or block and is mounted perpendicular to the direction in which it is desired to receive sound with the compressional axis lying in the direction in which it is desired to receive sound. A Rochelle salt crystal cut in this manner has piezo-electric properties similar to quartz. The electrical connections are made with electrodes of tin-foil, woods metal or otherwise, as known in the art. Adjacent crystals in each bank can be electrically connected by a thin coating of metal on the sides in contact. The coating is deposited on the crystal by feeding powdered metal into a flame and spraying the molten particles on the crystal. The flame must not be brought near enough to damage the crystal. This gives a good contact without loading the crystal too heavily. The adjacent banks can be electrically connected by strips of tin-foil either in series or parallel to obtain the desired impedance. The method used forms no part of this invention and for clarity is not shown in the drawing.

In Fig. 7 the leads 17 from a receiver are connected to resistance 25 across the cathode and grid of the first tube 26 of an amplifier. The amplifier has two high frequency stages associated with tubes 26 and 27, which have a single control as indicated at 28, a detector 29 and an audio stage associated with tube 30. Plate and screen grid potentials are supplied by battery 31 and the sound is heard in the phones 32. Suitable resistances are supplied as shown to obtain the proper potentials on the grids and screen grids. Also, suitable stopping condensers are used, as shown, to keep the high anode potential off the grid of each succeeding tube and suitable radio frequency by-pass condensers across the biasing resistances and also across the source of potential. This amplifier is designed to cover the frequency range included between 15 and 60 kilocycles. Such a range of frequency should be covered in order that the frequencies of maximum sound output, which vary with the type and speed of propeller, can be tuned in to give the maximum sound response and hence the maximum range. The amplifier may, also, be provided for autodyne or heterodyne reception as well as simple detection as this sometimes tends to increase the over-all sensitivity and thereby increase the range of detection.

Such an amplifier connected to one of these types of super-audible sound receivers comprises in combination my invention. For installation on board ship a receiver of the nature of that shown in Fig. 3 is preferred because of its streamlined form.

It is obvious that apparatus similar in principle but differing in details of construction and frequency range to be covered can be employed for various purposes of directive sound detection as for instance the detection of airplanes, location of machine gun, etc.

I claim:

1. A method of detecting the presence of a source of audio frequency sound which sound also includes audibly modulated ultra-audible vibrations, which comprises utilizing at a receiving station the modulated ultra-audible vibrations to generate similarly modulated ultra-audible variations in electrical potential and producing an indication of said modulation frequencies.

2. A method of detecting the presence of rotating propellers by means of the audibly modulated ultra-audible component of the emitted sound, which comprises utilizing at a receiving station the modulated ultra-audible vibrations to generate similarly modulated ultra-audible variations in electrical potential and producing an indication of said modulation frequencies.

3. A directive receiver for detecting the presence of an audio frequency sound set up by rotating propellers, which sound also includes audibly modulated ultra-audible components in a frequency range between 20 and 60 kilocycles, said receiver comprising a receiving surface whose dimensions are large in proportion to the wave length of sound energy having a frequency of 60 kilocycles, said surface being composed of a plurality of sensitive electro-mechanical energy interchanging elements whose dimension normal to the receiving surface is less than a half wavelength in the material of the elements of a frequency of 60 kilocycles.

4. A receiver as defined in claim 3 wherein said receiving surface is elongated to present a horizontal dimension which is large as compared to its vertical dimension.

5. An untuned, highly directive, ultra-audible sound receiver, comprising an elongated casing open along one side, an insulating coating on the inside of said casing, a plurality of sensitive electro-mechanical energy interchanging elements disposed to form a receiving surface at the opening in the side of the casing, and an elastic substance covering said casing in streamline form, rendering the casing water-tight and forming a sound window through which sound waves may penetrate to the active elements.

6. An untuned, highly directive, ultra-audible sound receiver, which comprises a casing open at one end and adapted for mounting on a rotatable support, an insulating coating on the inside of the casing, a plurality of elements of sodium potassium tartrate disposed to form a receiving surface at the opening in the end of the casing, said surface having dimensions that are large as compared with the wave-length of the sound energy to be received, the dimensions of said elements normal to said receiving surface being less than a half wave-length in sodium potassium tartrate of the highest frequency to be received, and an elastic substance covering said casing, assuring water-tightness and forming a sound window through which the sound waves penetrate to the active elements.

7. An untuned, highly directive, ultra-audible sound receiver, which comprises an elongated casing open along one side and adapted for mounting on a rotatable support, an insulating coating on the inside of the casing, a plurality of elements of sodium potassium tartrate disposed to form an elongated receiving surface at the opening in the side of the casing, the greater dimension of the receiving surface being large in proportion to the wave-length of the sound energy to be received, the dimension of the elements normal to the receiving surface being less than a half wave-length in sodium potassium tartrate of the highest frequency to be received, and an elastic substance covering the casing in streamline form, rendering the casing watertight and forming a sound window through which the sound waves penetrate to the active elements.

8. A method of detecting the presence and determining the direction of a source of sound by means of the ultra-audible component of the emitted sound which comprises receiving the sound waves on an elongated surface of sensitive elements, the thickness of the body of elements bearing said surface being less than one-half wave length of the highest frequency to be received, orienting said surface to obtain a maximum response and modulating the received ultra-audible sound energy to obtain an audible sound.

9. A sound transmitting and receiving device comprising a casing having an open end, means providing a substantially rigid cup-shaped member within said casing, a plurality of similar Rochelle salt crystals having surfaces parallel to the B and C axes and perpendicular to the compressional axis, means mounting said crystals with the compressional axes all normal to the same plane within said cup-shaped member, means providing electrodes on the surfaces of the crystals parallel to the B and C axes thereof, means connecting said electrodes together in an electrical circuit and means covering the ends of the casing including means filling the space between the end cover and the crystals for providing acoustical coupling between the crystals and an external propagating medium.

10. A sound transmitting and receiving device comprising a casing having an open end and including a recess formed within said casing adapted to hold a plurality of Rochelle salt crystals, a plurality of Rochelle salt crystals cut with large surfaces parallel to the B and C axes and end surfaces perpendicular to the compressional axis, said crystals being formed as elongated rectangular parallelepipeds, means mounting said crystals within said casing with the compressional axes of the crystals all parallel to each other and means covering the open end of the casing and providing acoustical coupling between the interior thereof and the external propagating medium.

11. A sound transmitting and receiving device comprising a casing having a substantially rigid back element and providing a recess within for a plurality of Rochelle salt crystals, a plurality of Rochelle salt crystals cut in the form of elongated rectangular parallelepipeds having large surfaces parallel to the B and C axes and end surfaces perpendicular to the compressional axis, means mounting said crystals on the end surface with the compressional axes of all the crystals parallel to each other, means providing electrodes on the surfaces parallel to the B and C axes, means connecting said electrodes in an electrical circuit and means covering the ends of the crystals and providing acoustic coupling between the external propagating medium and the interior of said casing.

12. A sound transmitting and receiving device comprising a casing, means providing a recess within said casing, said casing being open at one end, a rigid plate, means for mounting said rigid plate within said casing, a plurality of Rochelle salt crystals formed as elongated rectangular parallelepipeds having large surfaces parallel to the B and C axes and end surfaces perpendicular to the compressional axis, means mounting said crystals on said rigid plate with the ends flush therewith, means supporting said crystals at the surfaces parallel to the B and C axes, means for covering the open end of the casing and means providing acoustic coupling between the covering and said crystals.

13. A sound transmitting and receiving device comprising a casing, means providing a recess within said casing, said casing being open at one end, a rigid plate, means for mounting said rigid plate within said casing, a plurality of Rochelle salt crystals formed as elongated rectangular parallelepipeds having large surfaces parallel to the B and C axes and end surfaces perpendicular to the compressional axis, means mounting said crystals on said rigid plate with the ends flush therewith, means supporting said crystals at the surfaces parallel to the B and C axes, and means providing an acoustic coupling between the ends of the crystals and the external propagating medium including a cover covering the end of the casing.

14. A sound transmitting and receiving device comprising a casing having a substantially rigid back member and recessed to receive a plurality of Rochelle salt crystals, the casing being provide with an open end, a plurality of Rochelle salt crystals formed as elongated rectangular parallelepipeds with large surfaces parallel to the B and C axes and small end surfaces perpendicular to the compressional axis, means mounting said crystals with the small ends against said rigid back element and means providing an acoustic coupling with the external propagating medium including a cover covering the open end of the casing.

15. A sound transmitting and receiving device comprising a rigid casing open at one end and having a large recess therein, a plurality of Rochelle salt crystals formed as elongated rectangular parallelepipeds and having surfaces parallel to the B and C axes and small end surfaces perpendicular to the compressional axis, means for mounting said crystals in rows with the end surfaces forming substantially a parallel plane, means providing electrodes and electrical connections to the surfaces parallel to the B and C axes and means for acoustically coupling the ends of the crystals with the propagating medium including a cover covering the open end of the casing.

16. A sound transmitting and receiving device comprising a casing having an open end, means providing a rigid element within said casing, means mounting the same to the wall of said casing, said casing being recessed to receive said means, a plurality of Rochelle salt crystals formed as elongated rectangular parallelepipeds having large surfaces parallel to the B and C axes and small end surfaces perpendicular to the compressional axis, said crystals being provided with electrodes at the large surfaces parallel to the B and C axes, means mounting said crystals in rows with the small ends thereof abutting the element within the casing and having the electrode surfaces of the crystals successively contacting with each other, means spacing said rows one from another and electrical connecting means for connecting said rows in the desired series parallel relationship and means providing an acoustic coupling between the external medium and the ends of said crystals including a cover covering the ends of the casing.

17. An acoustical apparatus comprising in combination a housing provided with a face for the transit of acoustical energy, electromechanical interchanging means positioned within said housing, said means including a plurality of vibratory Rochelle salt crystals, each of which is provided with end surfaces perpendicular to its compressional axis.

18. An acoustical apparatus comprising in combination a housing provided with a face for the transit of acoustical energy, electromechanical interchanging means positioned within said housing, said means including a plurality of vibratory Rochelle salt crystals, each of which is provided with end surfaces perpendicular to its compressional axis and with the compressional axis substantially perpendicular to the face of said housing.

HARVEY C. HAYES.

REFERENCES CITED

The following references are of record in the file of this patent:

UNITED STATES PATENTS

| Number | Name | Date |
|---|---|---|
| 1,380,981 | Langmuir | June 7, 1921 |
| 1,471,547 | Chilowsky | Oct. 23, 1923 |
| 1,481,946 | William | Jan. 29, 1924 |
| 1,562,950 | Fessenden | Nov. 24, 1925 |
| 1,584,613 | Comstock | May 11, 1926 |
| 1,802,781 | Sawyer et al. | Apr. 28, 1931 |
| 1,807,658 | Godsey | June 2, 1931 |
| 2,248,870 | Langevin | July 8, 1941 |

FOREIGN PATENTS

| Number | Country | Date |
|---|---|---|
| 145,691 | Great Britain | July 28, 1921 |
| 613,799 | France | Nov. 29, 1926 |
| 664,037 | France | Apr. 16, 1929 |